United States Patent [19]

Grossmann et al.

[11] Patent Number: 4,711,681
[45] Date of Patent: Dec. 8, 1987

[54] FASTENING OF A COVERING MATERIAL TO A SUBSTRATUM

[76] Inventors: Jürg Grossmann, Birrwaldstr. 19, CH-8135 Langnau a. A.; Marcel Grossmann, Maeschackerstr. 196, CH-8911 Rottenschwil, both of Switzerland

[21] Appl. No.: 581,312

[22] Filed: Feb. 17, 1984

[30] Foreign Application Priority Data

Feb. 25, 1983 [DE] Fed. Rep. of Germany ....... 3306627
Feb. 25, 1983 [DE] Fed. Rep. of Germany ....... 3306630
Feb. 25, 1983 [DE] Fed. Rep. of Germany ... 8305304[U]

[51] Int. Cl.⁴ ............................................. B32B 31/12
[52] U.S. Cl. ....................................... 156/71; 156/283; 156/313
[58] Field of Search .................. 156/72, 152, 283, 284, 156/309.6, 313, 327, 155, 153, 306.6, 311; 428/92, 95, 195, 198, 200, 240, 247, 348, 378, 40, 354; 427/416, 154

[56] References Cited

U.S. PATENT DOCUMENTS

| | | | |
|---|---|---|---|
| 2,608,542 | 8/1952 | Smith et al. | 156/283 X |
| 3,014,829 | 12/1961 | Curtin | 156/71 X |
| 3,309,259 | 3/1967 | Schwartz | 428/95 |
| 3,400,038 | 9/1968 | Burgess | 428/347 |
| 3,622,423 | 11/1971 | Hadley | 156/313 X |
| 3,712,845 | 1/1973 | Hartung | 156/71 X |
| 4,075,377 | 2/1978 | Aitchison et al. | 428/95 |
| 4,096,104 | 6/1978 | Spain et al. | 427/154 X |
| 4,123,305 | 10/1978 | Krzeszowski | 156/71 |
| 4,230,755 | 10/1980 | Morris | 428/95 |
| 4,234,649 | 11/1980 | Ward | 428/355 X |
| 4,405,668 | 9/1983 | Wald | 428/354 X |
| 4,557,774 | 12/1985 | Hoopengardner | 156/71 |

FOREIGN PATENT DOCUMENTS 51-23535 7/1976 Japan .................................. 156/313

OTHER PUBLICATIONS

Whittington's Dictionary of Plastics, Technomic Publishing Co., Stamford, Conn., 1968, p. 5180.

Primary Examiner—Donald E. Czaja
Assistant Examiner—Ramon R. Hoch
Attorney, Agent, or Firm—Bachman & LaPointe

[57] ABSTRACT

Floor covering, such as carpets or other covering materials for residential and general furnishing, are fixed to a floor or other surface by means of an applied bonding layer. Embedded into the bonding layer are adhesive particles which are made chemically passive and the cohesive forces of which are greater in the thermoplastic state than their adhesive forces and which are converted, only after the carpet has been laid and adjusted in position, from their non-adhesive state into a malleable tacky phase of the layer as a result of the effect of temperature, after which a firm bond is produced in a cooling phase as a result of the lowering of this temperature. Alternatively, the bonding layer may be provided by a separate interlayer.

7 Claims, 4 Drawing Figures 4,711,681

FASTENING OF A COVERING MATERIAL TO A SUBSTRATUM

BACKGROUND OF THE INVENTION

The invention relates to a method of fastening covering material, such as floor coverings and wall linings to a surface of a substratum, especially at least partially flexible sheets such as carpets, which need to be adjusted into their correct position prior to fixing, to the surface of a floor, by means of a bonding layer. Furthermore, the invention embraces a bonding interlayer for this purpose, and covering material provided with a bonding layer.

West German Utility Model No. 7,905,528 describes an aid, for laying a carpet, in the form of a woven or knitted netting, consisting of natural and/or synthetic fibres and/or threads, and impregnated with a plasticizer-free pressure-sensitive adhesive. This tacky structure is covered on both sides with oiled paper or foil before the laying operation, to allow it to be transported in rolls.

Before the carpet is laid, the desired length of netting is cut from the roll and the protective paper is removed from both sides. The netting is then stuck to the floor and subsequently covered with the carpet, so that the latter is connected to the floor immovably as a result of the netting adhering to it. The essential disadvantage is that it is not possible to adjust the position of the carpet on the tacky netting. In addition, the netting is difficult to handle in spite of the protective paper. A further defect is the removal of the carpet results both in some disintegration and in considerable defacing of the floor by remains of the netting and by the adhesive, neither of which can be removed easily.

Similar disadvantages exist in the use of double-sided adhesive tapes which, in addition, only allow the covering to be fixed in strip-shaped zones. The region between these zones remains unfixed, and the covering tends to form folds to a greater extent there.

There are also problems with carpets which are already provided at the factory with an adhesive layer, likewise protected by paper, or else have to be laid at the place of fitting with a liquid adhesive coated on the floor.

SUMMARY OF THE INVENTION

With these circumstances in mind, the object of the invention is to provide a simpler method of fastening a carpet or other covering material, particularly but not necessarily to a substantially rigid substratum. It is also desirable to be able to detach, e.g., a laid carpet from the floor, without the floor and/or the carpet being soiled or damaged.

In accordance with the invention in a method of fastening a covering material to the surface of a substratum, the material is layed against the substratum with an interposed non-active bonding agent, and the bonding agent is subsequently activated to bond the material to the substratum.

The covering material can then be adjusted to its correct position and only then the bonding agent activated, e.g. through the covering material, to complete the fixing.

The bonding agent and its activation may take a variety of forms. Thus, adhesive particles, made chemically passive, may be provided, in a non-adhesive state, between the surfaces to be fixed to one another, and the adhesive particles are activated, after laying, as a result of the effect of temperature, and a firm bond is produced as a result of the lowering of this temperature, for example during natural cooling. For this purpose, the cohesive forces of the adhesive particles are preferably greater in the thermoplastic state than their adhesive forces; and after cooling, the latter are then greater than the cohesive forces.

During the activated period after the heating, which preferably amounts to approximately twenty minutes, the adhesive mixture remains malleable and tacky; and subsequently solidifies to provide the adhesion.

The adhesion may be reversible, so that it will be possible to detach the covering material again upon subsequent reheating, that is to say the malleable tacky state can be restored, whereby it becomes easy to remove the covering and/or the bonding layer.

Another method also coming within the scope of the invention involves embedding into the bonding layer of a covering material adhesive particles which are made chemically passive and the cohesive forces of which are greater in the thermoplastic state than their adhesive forces and which are converted, after laying, from their non-adhesive state into a malleable tacky phase as a result of heating, after which a firm bond is produced upon subsequent cooling. During the cooling process, the adhesive forces become increasingly greater than the cohesive forces.

Here, too, the firm bond may also be reversible, that is to say it will be possible to detach the covering material again as a result of heating, that is the adhesive particles can be restored to the malleable tacky phase.

When the covering material is manufactured, this bonding layer may be produced on its back or lower surface.

The process according to the invention can be put into practice, for example, by means of a thermoplastic material, with which at least 50% by weight of dicyclohexyl phthalate relative to the solids content are admixed, or else by means of at least one thermoplastic synthetic resin which generates properties of a hot-melt adhesive by means of a plasticizer solid at room temperature and an addition of copolymers of ethylene and vinyl acetate. Moreover, the last mentioned copolymers are used for hot-sealing coating, although they would not generate properties of a hot-melt adhesive there.

The new method may also be carried out using an aid in the form of an interlayer comprising a flat mesh of filaments, consisting of inorganic or organic fibres, provided with a thermoplastic material containing chemically passivated adhesive particles. Alternatively the interlayer may comprise a nonwoven material, consisting of organic or inorganic fibres, which is impregnated with a thermoplastic material containing chemically passivated adhesive particles. Instead of the nonwoven material, a foil could be used. These interlayers form an independent feature of the invention.

Moreover, the adhesive particles containing an activating agent could be in the form of granules which are distributed over the surface of the substratum.

In a further variation of the new method, a tacky bonding agent is initially covered with an encasing or sheathing layer or coating of non-adhesive material which is disruptable to expose the bonding agent as a result of a mechanical effect or an acoustic effect or even as a result of melting. The bonding layer is passivated by means of the covering and can thus be transported and laid easily. Only after laying is the covering removed, destroyed or otherwise disrupted and a firm bond produced. In addition, the bond of the bonding layer can be reversible.

The covering layer or coating may be produced, if appropriate, by means of an immersion operation, and may consist of a meltable material such as wax or else brittle material which can be blasted or cracked off.

Consequently, according to this aspect of the invention, the bonding or adhesive layer is covered by an encasing non-adhesive layer and is thus introduced in a non-adhesive state between the surfaces to be fixed to one another, after which the bonding layer is activated by removing the encasing layer as a result of the mechanical effect, waves and/or temperature.

The covering material with which the invention is concerned, and which forms a further independent feature of the invention when provided with an integral bonding layer of the kind referred to, includes carpets and wall linings made of flexible materials and rigid coverings, such as panels or tiles. The interlayer or the covering material provided with the bonding layer can be handled easily, without special protective measures, until it is activated at the place of fitting. Activation is carried out when the covering material has been adjusted to its fitted position, or substantially so. Both as regards the interlayer and as regards the covering material, it is evident that storage and transport are possible without further precautions when the adhesive particles are passivated.

BRIEF DESCRIPTION OF THE DRAWINGS

Further advantages, features and details of the invention are apparent from the following description of three different examples and with reference to the accompanying drawings, in which.

DESCRIPTION OF PREFERRED EMBODIMENTS

Figure 1:
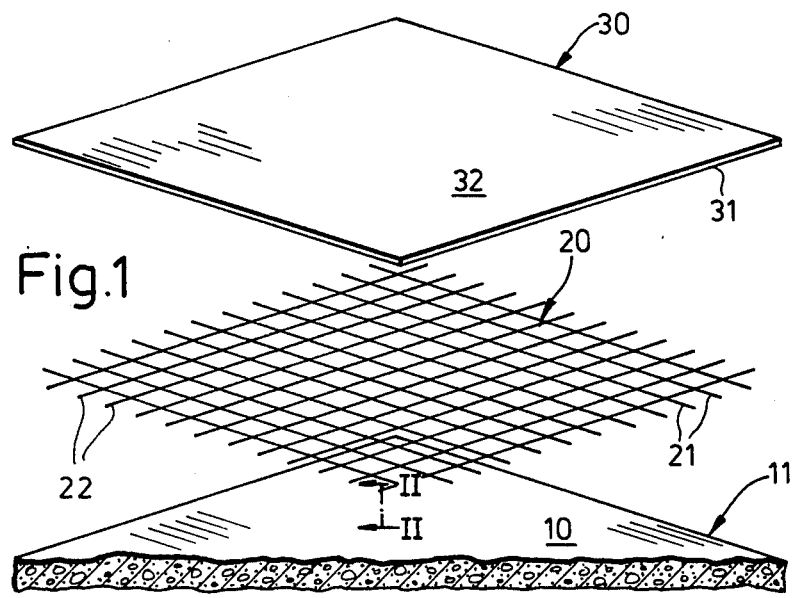
FIG. 1 shows an oblique view of part of a room in which one method of fitting a carpet is illustrated diagrammatically.

According to FIG. 1, an adhesive netting 20 consisting of warp threads 21 and weft threads 22 is laid on the surface 10 of the floor 11 of a room, which is not shown in any more detail for the sake of clarity. The weft threads 22 each have a material consisting of an adhesive and at least one admixed activating agent. The latter is a plasticizer which can become active and release the adhesive only above customary room-temperature limits.

Figure 2:
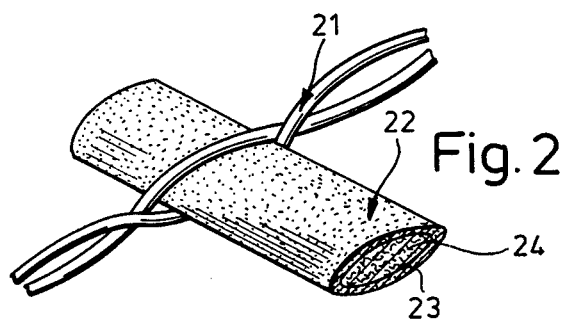
FIG. 2 shows an enlarged detail of FIG. 1 in a section on line II—II in FIG. 1.

FIG. 2 shows this mixture of adhesive and plasticizer as an outer layer 23 round a thread core 24, but this particular form is not essential. Thus, for example, the warp threads 21 may also be provided with the layer 23, possibly after immersion impregnation of the adhesive netting 20, or parts of the adhesive netting 20, possibly decomposed to resemble a granulate, may be made so that they can be activated thermally as bonding elements. Below an activation temperature of, for example, 60° C., the adhesive netting 20 is dry and can be displaced as desired over the surface 10. Under the effect of a higher temperature, which can be produced, for example, by microwave devices, by hot-air appliances, by means of infrared rays or by means of a type of smoothing iron, the adhesive is released by the activating agent, so that the adhesive netting 20 can be connected firmly to the surface 10 as a result of gentle pressure.

When a carpet 30 is applied to the bonding netting 20 in a passive state, the carpet can be displaced and arranged, as, desired, together with the bonding netting 20. When the bonding netting 20 or its adhesive is activated in the way described, an intimate connection arises between the surface 10 of the floor 11 and the lower surface 31 of the carpet 30, the upper surface of which is designated by 32.

It has been shown that even after activation it remains possible to correct the position of the carpet for approximately 10 to 20 minutes.

To allow the carpet 30 to be removed again after a longer bonding time, it is merely necessary to expose it again to the effect of temperature, as a result of which the mixture of adhesive and plasticizer becomes fluent again.

In a particular example according to FIGS. 1 and 2, the bonding netting 20, consisting of a rot-proof woven fabric or nonwoven material with a high melting point above the activation temperature, is impregnated in a dispersion consisting of at least one thermoplastic material, for example polyethylene, polyvinyl (acetate, propionate or chloride), polyamide or polyacrylic acid or copolymers or mixtures of these, and more than 50% of dicyclohexyl phthalate relative to the solids content, and is dried at below 60° C.

EXAMPLE I

A glass gauze fabric with a weight per unit area of 120 g/m$^2$ is impregnated with a solution of the following composition:
  31 parts of water
  2 parts of anti-foaming agent based on liquid parafin
  1 part of oxyethylated nonylphenol (9 EO)
  30 parts of copolymer dispersion consisting of butyl acrylate/vinyl chloride (50% dry matter)
  30 parts of dicyclohexyl phthalate (100%)
  4 parts of thickening agent based on polyacrylic acid
  2 parts of ammonia.

After drying, a layer of 100 g/m$^2$ remains. By means of this bonding netting, a needle-felt floor covering with a weight per unit area of 1000 g/m$^2$ can be fixed, in the way described above, to a PVC floor so as to be resistant to wheelchairs.

By means of the same glass fabric, a tufting carpet of 800 g/m$^2$ was glued permanently, and so as to be shampoo-resistant, to a cement floor.

Particularly when the bonding netting 20 is to be laid in aircraft or in places where there is a similar fire risk, it will be produced either from plastics material, to which additions of flame-proofing agents, for example in the form of halogenated monomers such as vinylidene chloride or other chlorinated compounds, have been added as early as the production stage, or in soluble pigments, such as antimony trioxide or titanium dioxide, are worked into the actual netting material.

A naturally non-combustible glass gauze can be used as a supporting structure, and in addition the adhesive mass can be provided with additions ensuring low flammability and described in more detail here.

In a further production method, the fibres or nonwoven materials are treated with a solution of a flameproofing agent, for example with melamine phosphate resins, which polymerise during subsequent heat treatment on the fibre.

Figure 3:
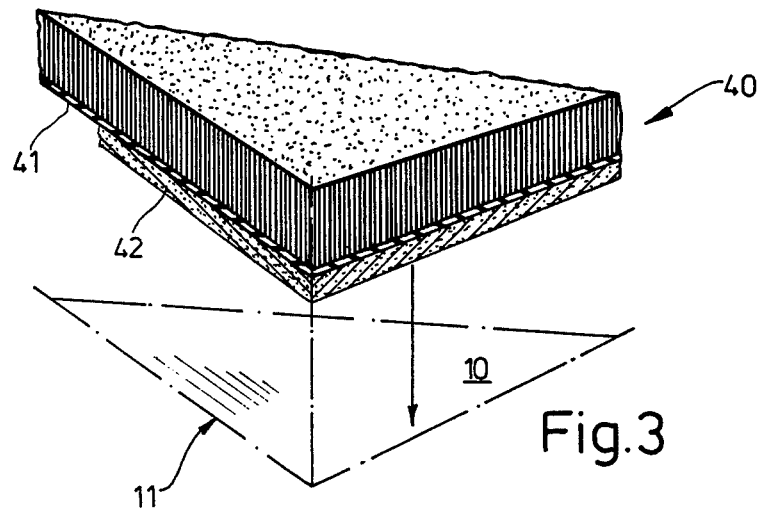
FIG. 3 shows a diagrammatic oblique view of a second method.

In the example shown in FIG. 3, a carpet 40 is provided on its underside 41 with a bonding layer 42. This is applied when the carpet 40 is produced and contains an adhesive and at least one admixed activating agent; the latter is a plasticizer which can become active and release the adhesive only above customary room-temperature limits.

Below an activation temperature of, for example, 66° C., the bonding layer 42 is dry and the carpet 40 can be displaced as desired over the surface 10. Under the effect of higher temperatures, which can be produced, for example, by means of hot air, microwaves, infrared radiators or a type of smoothing iron, the adhesive is released by the activating agent and the bonding layer 42 becomes malleable and tacky, so that it can be connected firmly to the surface 10 as a result of gentle pressure. The malleable and tacky phase, within which it is still possible to orientate and align the carpet 40 directly, amounts here, according to experience, to approximately 20 minutes, after which an intimate connection has been obtained between the bonding layer 42 and the surface 10; a correction time extending from the moment of activation to the moment when the firm bond is obtained is, therefore, less than half an hour.

To allow the carpet 40 to be removed again after a longer bonding time, it is merely necessary to cause a temperature effect again, as a result of which the mixture of adhesive and plasticizer becomes malleable again.

In an example of the embodiment shown in FIG. 3, the bonding layer 42 consists of a dispersion with at least one thermoplastic, for example polyvinyl (for example, acetate, propionate or chloride), polymide, polyethylene, polyacrylic acid or copolymers or mixtures of these, and more than 50% of dicyclohexyl phthalate relative to the solids content. This bonding layer 42 is dried below a temperature of 66° C.

EXAMPLE II

The carpet 40 is impregnated with a solution of the following composition:
31 parts of water
2 parts of anti-foaming agent based on liquid parafin
1 part of oxyethylated nonylphenol (9 EO)
30 parts of copolymer dispersion consisting of butyl acrylate/vinyl chloride (50% dry matter)
30 parts of dicyclohexyl phthalate (100%)
4 parts of thickening agent based on polyacrylic acid
2 parts of ammonia.

Especially when the material 40 is used in buildings and apparatus, such as aircraft, where there is a fire risk, flame-retarding additives or pigments are also admixed, for example in the form of halogenated monomers, such as vinylidene chloride or other chlorinated compounds.

Likewise, insoluble pigments, such as antimony trioxide, can be worked in.

Figure 4:
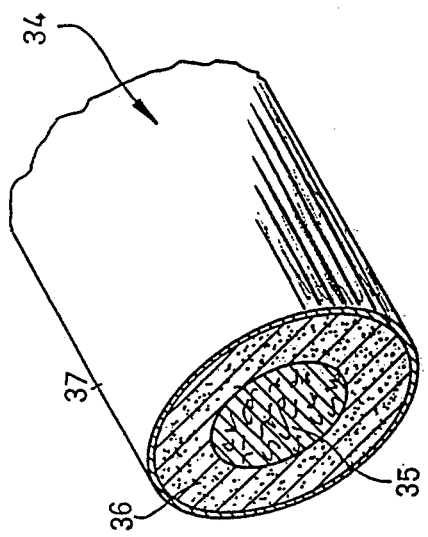
FIG. 4 shows a sectional view of part of an interlayer for use in a third method.

FIG. 4 shows a netting filament 34 from a bonding interlayer netting similar to the bonding netting 20 of FIG. 1.

This netting filament 34 consists of a skeleton filament 35, an adhesive layer 36 surrounding the latter at least partially, and an encasing or sheathing layer 37 covering the latter with a close fit, that is to say so that it cannot be pulled off in the manner of a foil. When the sheathing layer 37 is intact, this bonding netting is nonadhesive and can therefore be rolled without difficulty and can be displaced as desired over the surface 10.

When the bonding netting is spread out on the surface 10, for example at room temperature, a carpet 30 can be laid on it and aligned with the bonding netting which, in this state, is capable of slipping.

The sheathing layer 37 consists, for example, of a wax-like covering and can then be melted off as a result of the effect of heat, for example, by means of infrared waves or microwaves, hot air or the like; the previously encased adhesive layer 36 then being exposed to allow the carpet 30 to be fixed under pressure.

If the sheathing layer 37 is formed by a brittle enveloping material, this can be broken by means of mechanical forces, for example as a function of frequency. When the sheathing layer 37 is disintegrated in this way, here again the adhesive layer 36 is activated, i.e. exposed, and an intimate connection betwen the surface 10 and the lower surface 31 if the carpet 30 is produced.

The adhesive layer 36 can also bond directly to the lower surface 41 of the carpet 40 or a nonwoven sheet and can be covered by the sheathing layer 37.

What is claimed is:

1. A method of fastening a floor covering material to the surface of a substratum by means of a discrete bonding layer which comprises: providing a bonding layer in a non-adhesive state, said bonding layer comprising chemically passive adhesive particles mixed with a plasticizer in an aqueous solution presenting, in the fused state, cohesive forces which are greater than adhesive forces thereof; applying said bonding layer to a supporting mesh of non-metallic, graphite free filaments by immersion of said mesh of filaments in said solution, drying said bonding layer at a temperature below 66° C. to remove water; placing said bonding layer-mesh as a composite between said floor covering material and said substratum surface as an interlayer between said covering material and said substratum; adjusting said floor covering material substantially to its desired position relatively to said substratum; activating said adhesive particles by heat; and subsequently cooling to produce a firm bond whereby the adhesive forces of said bonding layer exceed said cohesive forces.

2. A method according to claim 1, wherein said activating step is accomplished by heat generated by instrumentalities other than a vibratory, magnetic field and said firm bond is such that, upon subsequent reheating, said covering material is releasible from said substratum.

3. A method according to claim 1, wherein said adhesive particles, mixed with a plasticizer, are applied to a nonwoven fabric and are dried, after which said fabric is laid as an interlayer between said covering material and said substratum.

4. A method according to claim 1, wherein said adhesive particles, together with any admixtures, are converted into a plastic state by heating, with consequential thermal activation of said adhesive, after which said plastic state is maintained over an effective period of time within which said substratum surface and said covering material are adjusted relatively to one another and pressed together, all said heating steps being accomplished by instrumentalities other than a vibratory, magnetic field.

5. A method according to claim 1, wherein said thermoplastic material is selected from the group consisting of polyvinyl acetate, polyvinyl propionate, polyvinyl chloride, polyamide, polyethylene, polyacrylate, copolymers thereof, and mixtures thereof.

6. A method according to claim 1, wherein methyl phenyl isophthalate is present as a plasticizer in said bonding layer.

7. A method according to claim 1, wherein said bonding layer includes dicyclohexyl phthalate as a plasticizer in an amount of more than 50% by weight relatively to a solids content and any flame retarding additive.

* * * * *